C. W. JASMER.
TIRE PROTECTOR.
APPLICATION FILED JUNE 2, 1909.
967,779.
Patented Aug. 16, 1910.
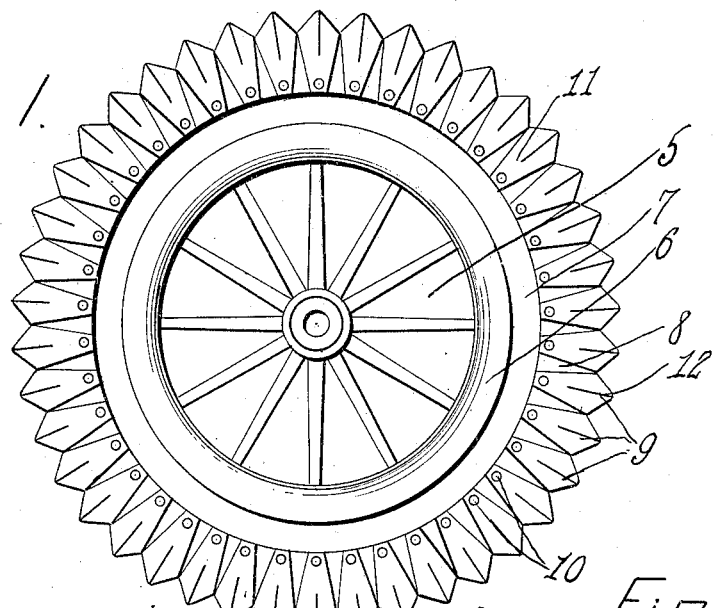
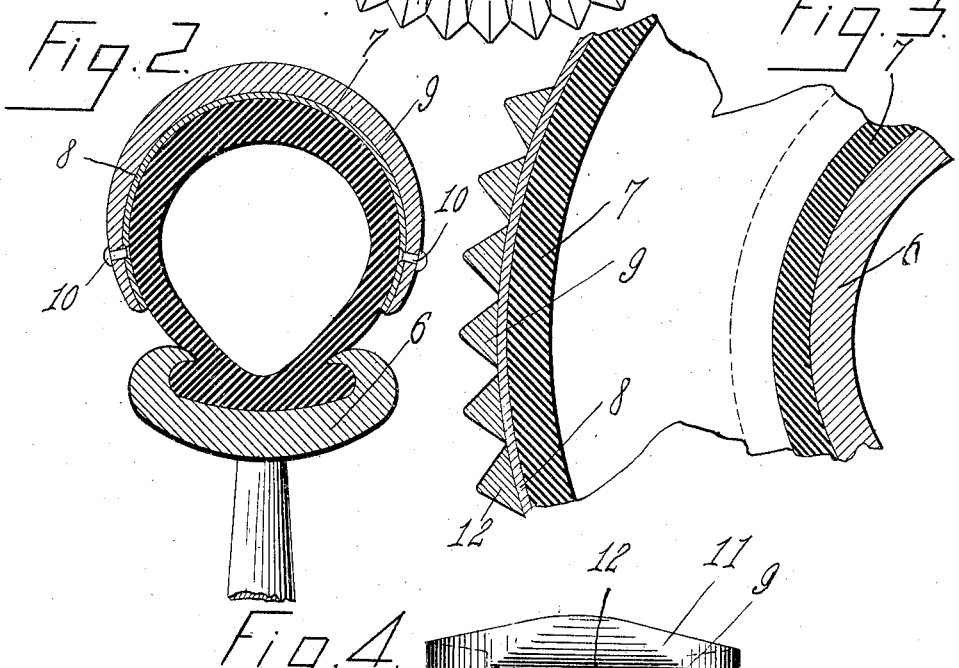
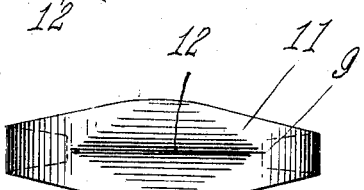
Inventor
Charles W. Jasmer
Witnesses
By
Attorneys

UNITED STATES PATENT OFFICE.

CHARLES W. JASMER, OF MARSHFIELD, WISCONSIN.

TIRE-PROTECTOR.

967,779.  Specification of Letters Patent.  Patented Aug. 16, 1910.

Application filed June 2, 1909. Serial No. 499,828.

*To all whom it may concern:*

Be it known that I, CHARLES W. JASMER, a citizen of the United States, residing at Marshfield, in the county of Wood, State of Wisconsin, have invented certain new and useful Improvements in Tire-Protectors; and I do hereby declare the following to be a full, clear, and exact description of the invention, such as will enable others skilled in the art to which it appertains to make and use the same.

The invention relates to a tire protector or covering and more particularly to that class of devices for use on vehicle and automobile tires or the like.

The primary object of the invention is the provision of a device which is adapted to be securely held about a vehicle or automobile tire so that the latter may be protected from wear and to prevent the possibility of puncturing the same.

A further object of the invention is the provision of a tire protector or covering of this character in which a vehicle tire will be prevented from slipping on ice or frozen ground and at the same time protecting the tire against puncture or excessive wear.

A still further object of the invention is the provision of a device of this character which is capable of being readily mounted upon a tire without the necessity of fastening mediums, and that is simple in structure, thoroughly reliable and efficient in operation and inexpensive to manufacture.

With these and other objects in view, the invention consists in the construction, combination and arrangement of parts, as will be hereinafter more fully described, illustrated in the accompanying drawings, which disclose the preferred form of embodiment of the invention, to enable those skilled in the art to carry said invention into practice, and as set forth in the claim hereunto appended.

In the drawings:—Figure 1 is a side elevation of a vehicle wheel with the invention applied thereto. Fig. 2 is a transverse sectional view of the same. Fig. 3 is a fragmentary longitudinal sectional view. Fig. 4 is a plan view of one of the steel clamp members.

Similar reference characters indicate corresponding parts throughout the several views in the drawings.

In the drawings the numeral 5 designates generally a vehicle wheel which is of the ordinary or well known construction having the usual clencher rim 6, in which is detachably mounted the ordinary pneumatic tire 7, although it is to be understood that the latter may be of any other well known form or type.

The tire protector or covering comprises a continuous strip of material 8, which latter is preferably of raw hide or closely woven fabric and is adapted to surround a greater portion of the cross sectional area of the tire 7, throughout the diameter thereof. Upon the outer face of the strip of material 8, throughout the diameter thereof are arranged a plurality of contacting clamps 9, preferably of steel or other metal, each being of substantially crescent shape in longitudinal section and secured near opposite extremities thereof to the material 8, by means of rivets 10. The said clamps 9 are formed with tapering extremities 11, to provide increased tread portions with respect thereto, and these tread portions 12, are of substantially triangular shape in cross section, so as to form teeth or projections peripherally of the wheel at the tread thereof.

In the mounting of the protector or covering the tire 7, is deflated and in this manner, the tire protector or covering may then be placed about the tire so that upon subsequent inflation thereof, the clamps 9 on the outer face of the strip of material 8, will grip the tire to securely mount the tire protector or covering upon the tire of the vehicle wheel, without the necessity of using fastening mediums to hold the covering thereabout or in position on the same. Furthermore it will be clearly obvious that when the tire protector or covering is mounted upon the tire it will serve to prevent puncturing of the same as well as overcoming any possibility of the slipping of the tire on ice or upon frozen ground.

In the use of the tire protector or covering it is clear that the life of the tire is increased as it will protect the same against excessive wear and tear which is usual upon ordinary rubber tires when in use.

From the foregoing, the construction and operation of the invention will be clearly apparent without the necessity of a more extended explanation and therefore the same has been omitted.

What is claimed is:—

A tire protector comprising an annular body of semicircular shape in cross section throughout its length, and a plurality of crescent-shaped clamps secured near opposite ends exteriorly of the body in contacting relation to each other, each clamp at its tread portion being of triangular shape in cross section.

In testimony whereof, I affix my signature, in presence of two witnesses.

CHARLES W. JASMER.

Witnesses:
R. E. ANDREWS,
O. G. LINDEMANN.